June 29, 1943.  L. J. DORNHOFER  2,322,834
SEAL
Filed June 23, 1941
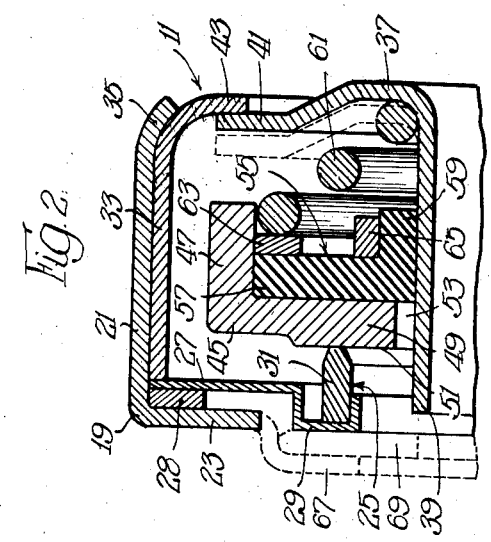
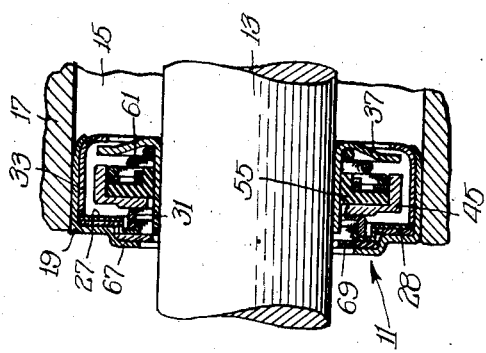
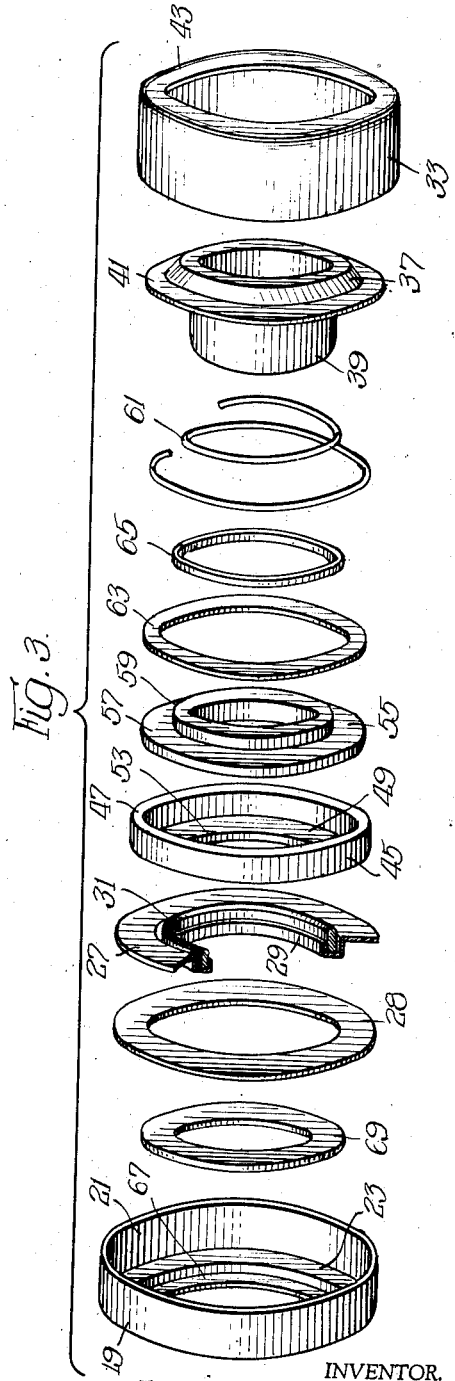
INVENTOR.
Louis J. Dornhofer,
BY Spencer, Marzall, Johnston & Cook.
attys Patented June 29, 1943

2,322,834

UNITED STATES PATENT OFFICE 2,322,834

SEAL

Louis J. Dornhofer, Chicago, Ill., assignor to Rotary Seal Company, Chicago, Ill., a corporation of Illinois Application June 23, 1941, Serial No. 399,261

1 Claim. (Cl. 286—11)

This invention relates in general to seals and sealing and has more particular reference to the sealing of rotating members, such as shafts, pipes and the like, for the prevention of the passage of fluid along the shaft past a wall or journal through which it extends.

An important object of the present invention is to provide a self-contained seal unit, including sealing elements assembled in a shell or casing, whereby the device may be merchandised as an integrated unit ready for assembly in sealing position on a shaft.

Another important object is to provide a seal unit of inexpensive construction and, to this end, to provide a device adapted for fabrication substantially entirely of metal parts of simple configuration.

Another important object is to provide a seal for rotating members, such as shafts and the like, having considerable flexibility or latitude in order to accommodate inaccuracies in shaft alignment and to afford a certain shaft sealing effect whether the shaft is in true alignment or not.

These and numerous other important objects, advantages and inherent functions of the invention will become apparent as the invention is more fully understood from the following description, which, taken in connection with the accompanying drawing, discloses a preferred embodiment of the invention.

Referring to the drawing:

Figure 1 is a sectional view taken through a seal embodying the present invention, the seal being shown assembled in operating position on a rotary shaft;

Figure 2 is an enlarged sectional view of the seal shown in Figure 1; and

Figure 3 is a perspective view of the several seal parts.

To illustrate the invention, I have shown on the drawing a seal 11 for use on a shaft or arbor member 13 in order to seal the same against leakage along the shaft through an opening 15 in a wall 17 through which the shaft or arbor member extends. The shaft or arbor to be sealed is usually a solid member having cylindrical outer surfaces, but, of course, may also be a hollow pipe. For this reason, the term "shaft or arbor" should be understood as including hollow pipe as well as solid shaft. Furthermore, the seal of my present invention may be used to seal the opening 15 around the member 13 either where the member rotates within the opening or where the wall 17 rotates about the member 13, that is to say, the device of my present invention is adapted to seal the space 15 between relatively rotatable arbor and wall members regardless of whether the wall rotates on the stationary shaft or whether the shaft rotates with respect to a stationary wall.

The seal comprises elements assembled and housed within a shell or rim 19 having cylindrical side walls 21 and an end wall 23 having an enlarged central opening to freely receive the shaft. The shell, of course, may be of any suitable or convenient size, and I prefer to form the same to fit snugly within the opening 15. Within the shell 19 is yieldingly supported annular seal seat means 25 comprising a resilient member 27, preferably an annular plate of flexible material such as thin sheet metal. This annular plate, at its inner circular edge, is formed to provide an annular groove 29 in which is sealingly secured an annular ring-like seal ring of relatively soft material, such as bronze, and may be secured in the grooved portion 29 of the flexible plate 27, as by soldering or brazing. The plate 27 is preferably mounted in the shell 19 in position overlying the end wall 23, the peripheral edges of the plate 27 being formed to fit within the cylindrical walls of the shell 19. A gasket 28 is preferably disposed between the peripheral portions of the end wall 23 and the plate 27, and the plate and gasket are held firmly in place by means of a cylindrical shell member 33 of a size to fit snugly within the cylindrical walls 21 of the shell 19. The shell 33, at one end, bears upon and squeezes the peripheral portions of the plate 27 and gasket 28 against the end wall 23, and the member 33 is held in place by curling or peening the edges cf the wall 21, as at 35, upon the end of the shell 33 remote from the plate 27.

Within the shell 19 is disposed a sleeve-like casing member 37, formed preferably of sheet metal, and comprising a cylindrical portion 39 adapted force-fittedly to receive the shaft 13. One end of the portion 39 extends within the seal element 31, the member 37, at the opposite end of its cylindrical portion 39, being formed with an outstanding flange 41 which extends behind the inwardly turned edge 43 of the casing member 33.

In position loosely encircling the cylindrical portion 39 of the member 37, an annular cup-shaped member 45 is disposed within the casing 19. The member 45 has preferably cylindrical side walls 47 and a bottom wall 49 formed with a finished surface 51 in position to engage and form a running seal with the ring 31. The bottom wall of the member 45 is formed with a central opening 53 through which the cylindrical portions 39 of the member 37 extend, the opening 53 being sufficiently large to freely receive said portions 39. Within the cup-shaped member 45 is disposed a sealing member 55 preferably comprising resilient rubber-like material, such as synthetic rubber, having elastic properties adapted to grippingly and sealingly engage the seal member 45 and the outer surfaces of the cylindrical portion 39, the member 55, to this end, comprising an annular flange portion 57 adapted to extend within the cup member 45 in position overlying the bottom wall 49 thereof within the annular walls 47, the member 55 also comprising a cylindrical portion 59 formed to tightly, yet yieldingly, embrace the cylindrical portions 39 of the member 37.

The flange portion 57 of the sealing gasket 55 is snugly pressed into and retained within the member 45 by means of a spring 61, the spring bearing at its opposite ends, respectively, upon the flange portion 41 of the member 37 and upon the peripheral portions of the gasket flange 57 to press the same into the cup member 45, and to press the cup member 45 upon the ring member 31. A protecting ring or washer 63 may be interposed between the peripheral edges of the gasket flange 57 and the end of the spring 61 which bears thereon. Likewise, a squeezing ring 65 may be applied upon the gasket portion 59 in order to squeeze the same inwardly upon the cylindrical portions 39 of the member 37.

The spring 61 is preferably of helical configuration and is compressible in the direction of the axis of the helical spring so that the coils of the spring may fit the one within the other as the spring is compressed to thereby conserve space occupied by the spring.

When the seal is mounted in operating position, as shown in Figure 1, the cylindrical portions 39 of the member 37, being tightly and frictionally secured on the shaft, will rotate therewith and form a seal between the member 37 and the shaft. The resilient gasket 55 forms a sealing and driving grip between the gasket portion 59 and the encircled cylindrical portion 39 of the member 37. The resilient gasket 55 also forms a driving and sealing engagement with the bottom of the cup member 45 at the peripheral edges of the gasket flange 57. The cup-shaped seal member thus is turnably secured on the shaft through the driving and sealing effect afforded by the resilient rubber-like gasket 55.

The casing 19, since it forms a driving fit with the walls 17 within the opening 15, prevents leakage between the cylindrical walls 21 and the wall 17. Leakage between the peripheral edges of the flexible plate 27 and the casing 19 is prevented by the gasket 28 and the tight joint afforded by the compression of the gasket and plate between the end wall 23 and the member 33. The sealed connection of the ring 31 in the groove 29 prevents leakage between the plate 27 and the ring 31 which, it will be noted, is mounted against turning with respect to the wall 17. The spring 61 operates not only to compress the peripheral portions of the gasket 55 in the cup 45, but also to thrust the cup member 45 into sealing engagement with the ring 31 to form a running seal or ground joint between the finished surface 51 of the member 45 and the facing edge of the ring 31, thereby preventing fluid leakage through said ground joint.

It will be noted that radial movement of the member 37 and the seal members 45, 55 and 61 carried on the member 37 is not restricted with respect to the casing 19 and the seal ring 31 mounted therein; but considerable relative movement of the shaft-supported parts is allowed with respect to the wall-mounted parts of the seal structure. Consequently, the seal is able to function despite considerable misalignment of the shaft 13 within the opening 15 without impairing the sealing effect, the flexibility of the member 27 and of the rubber-like gasket 55 contributing to the maintenance of the sealing effect, since the flexibility of the plate 27 will, to a limited degree, permit the ring 31 to follow any wobble that may be imparted to the member 45 due to misalignment of the shaft, while the rubber-like gasket itself will yield to minimize the seal-impairing effect of wobbling; that is to say, the effects of shaft wobble are imparted in lesser degree to the member 45 due to the inherent resilience of the gasket member 55. If desired, the bottom wall 23 may be extended inwardly, as indicated in dotted lines in Figure 2, to provide a flange 67 overlying the grooved portions 29 which carry the ring 31, in order to afford a stop limiting the movement of the ring 31, and if desired, a resilient gasket 69 may be interposed between the flange 67 and the ring 31 to aid in preventing the penetration of dust to the member 31 and finished surface 51 through the bottom wall of the casing 19.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

A replaceable seal unit for sealing a wall opening around an arbor extending therein, comprising a cylindrical shell forming a housing and sized for snug fit in said wall opening, a sleeve disposed within said shell and sized for snug fit on said arbor, said sleeve, at one end, having an outwardly extending flange and said shell, at one end, having a co-operating inwardly extending lip overlying said flange to limit axial movement of the shell in one direction within the housing, a diaphragm at the other end of the housing comprising a plate of resilient material sealingly secured on the housing at the margin of the plate, said plate having a central opening for accommodating the arbor, a seal ring sealingly secured on said plate at and around said central opening, a co-operating seal element forming a seat for said ring, said seal element having a central opening for accommodating said sleeve and being mounted within the housing in position encircling the sleeve between the outstanding flange thereof and the said seal ring, resilient gasket means sealing said seal element upon said sleeve, and spring means extending between the seal element and the outstanding flange of the sleeve and operative to normally urge the seal element on the sleeve in a direction to press upon and form a running seal with said ring.

LOUIS J. DORNHOFER.